(12) United States Patent
Vermani et al.

(10) Patent No.: US 8,730,878 B2
(45) Date of Patent: *May 20, 2014

(54) POWER AND RESOURCE EFFICIENT APPDU BASED APPROACH WITH SCHEDULED BLOCK ACKS FOR WLAN

(75) Inventors: Sameer Vermani, San Diego, CA (US); Hemanth Sampath, San Diego, CA (US); Vinay Sridhara, Santa Clara, CA (US); Alok Aggarwal, Foster City, CA (US); Vincent Knowles Jones, IV, Redwood City, CA (US); Maarten Menzo Wentink, Utrecht (NL); Santosh Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 648 days.

This patent is subject to a terminal disclaimer.

(21) Appl. No.: 12/273,089

(22) Filed: Nov. 18, 2008

(65) Prior Publication Data

US 2010/0046441 A1 Feb. 25, 2010

Related U.S. Application Data

(60) Provisional application No. 61/090,521, filed on Aug. 20, 2008.

(51) Int. Cl.
*H04W 4/00* (2009.01)

(52) U.S. Cl.
USPC ............................. 370/329; 370/330; 370/334

(58) Field of Classification Search
USPC ................. 370/329, 330, 334, 336, 338, 337; 70/337
See application file for complete search history.

(56) References Cited

U.S. PATENT DOCUMENTS

| | | | |
|---|---|---|---|
| 7,145,887 B1* | 12/2006 | Akgun et al. | 370/321 |
| 7,242,694 B2 | 7/2007 | Beser | |
| 7,433,370 B1 | 10/2008 | Tymes | |
| 7,447,148 B2* | 11/2008 | Gao et al. | 370/216 |
| 8,218,519 B1* | 7/2012 | Chamberlain et al. | 370/343 |
| 8,406,250 B2 | 3/2013 | Kuroda et al. | |
| 2005/0152359 A1* | 7/2005 | Giesberts et al. | 370/389 |
| 2005/0226273 A1 | 10/2005 | Qian | |
| 2005/0285719 A1 | 12/2005 | Stephens | |

(Continued)

FOREIGN PATENT DOCUMENTS

| | | |
|---|---|---|
| CN | 1163524 A | 10/1997 |
| CN | 101064689 A | 10/2007 |

(Continued)

OTHER PUBLICATIONS

International Search Report—PCT/US2009/054508—International Search Authority, European Patent Office, Apr. 8, 2010.

(Continued)

*Primary Examiner* — Farah Faroul
(74) *Attorney, Agent, or Firm* — Dang M. Vo

(57) ABSTRACT

Disclosed are methods and apparatuses for communications by which a data packet is generated for transmission to a node, or by which a data packet is received from a node, the data packet including a header and data, wherein a channel designation for a node to send an acknowledgement to an apparatus or a transmitting node is embedded in the header of the data packet.

51 Claims, 10 Drawing Sheets

(56) References Cited

U.S. PATENT DOCUMENTS

| | | | |
|---|---|---|---|
| 2006/0056362 A1* | 3/2006 | Jang et al. | 370/336 |
| 2006/0056443 A1 | 3/2006 | Tao et al. | |
| 2007/0097927 A1* | 5/2007 | Gorokhov et al. | 370/335 |
| 2007/0147284 A1* | 6/2007 | Sammour et al. | 370/328 |
| 2007/0159982 A1 | 7/2007 | Singh et al. | |
| 2007/0189207 A1 | 8/2007 | Sammour et al. | |
| 2007/0211667 A1* | 9/2007 | Agrawal et al. | 370/335 |
| 2007/0230454 A1* | 10/2007 | Ginzburg et al. | 370/389 |
| 2007/0297351 A1 | 12/2007 | Trainin | |
| 2008/0095127 A1 | 4/2008 | Taki | |
| 2008/0144586 A1* | 6/2008 | Kneckt et al. | 370/337 |
| 2008/0181251 A1* | 7/2008 | Nishibayashi et al. | 370/445 |
| 2008/0259855 A1* | 10/2008 | Yoon et al. | 370/329 |
| 2008/0282126 A1* | 11/2008 | Chindapol et al. | 714/748 |
| 2008/0310389 A1* | 12/2008 | Suzuki et al. | 370/346 |
| 2009/0046618 A1* | 2/2009 | Shiba et al. | 370/312 |
| 2009/0086699 A1* | 4/2009 | Niu et al. | 370/342 |
| 2009/0262035 A1* | 10/2009 | Gonikberg | 343/757 |
| 2009/0310692 A1 | 12/2009 | Kafle et al. | |
| 2010/0020780 A1* | 1/2010 | Hirano et al. | 370/338 |
| 2010/0046367 A1* | 2/2010 | Vermani et al. | 370/230 |
| 2010/0172334 A1* | 7/2010 | Akhmetov | 370/338 |
| 2010/0189056 A1* | 7/2010 | Nishibayashi et al. | 370/329 |
| 2010/0315989 A1* | 12/2010 | Reznik et al. | 370/315 |
| 2011/0013601 A1* | 1/2011 | Cerasa et al. | 370/336 |
| 2012/0045005 A1* | 2/2012 | Kim et al. | 375/260 |
| 2012/0281663 A1* | 11/2012 | Chen et al. | 370/329 |

FOREIGN PATENT DOCUMENTS

| | | |
|---|---|---|
| JP | 2006352844 A | 12/2006 |
| JP | 2006352896 A | 12/2006 |
| JP | 2008512927 A | 4/2008 |
| JP | 2008109277 A | 5/2008 |
| JP | 2009509469 A | 3/2009 |
| JP | 2012501102 | 1/2012 |
| TW | I291291 B | 12/2007 |
| TW | I291821 B | 12/2007 |
| WO | 2006027964 | 3/2006 |
| WO | 2006091809 | 8/2006 |
| WO | WO2010009046 | 1/2010 |

OTHER PUBLICATIONS

Written Opinion—PCT/US2009/054508, International Search Authority, European Patent Office, Apr. 8, 2010.

Taiwan Search Report—TW098128091—TIPO—Jan. 2, 2013.

* cited by examiner

APPARATUS FOR COMMUNICATION
*Page-900*

MODULE FOR GENERATING A DATA PACKET FOR TRANSMISSION TO A NODE, WHEREIN THE DATA PACKET COMPRISES A HEADER AND DATA
*902*

MODULE FOR EMBEDDING IN THE HEADER OF THE DATA PACKET A CHANNEL DESIGNATION FOR THE NODE TO SEND AN ACKNOWLEDGEMENT
*904*

FIG. 9

APPARATUS FOR
COMMUNICATION
1000

MODULE FOR RECEIVING A DATA PACKET FROM A
NODE, WHEREIN THE DATA PACKET COMPRISES A
HEADER AND DATA
1002

MODULE FOR GENERATING AN ACKNOWLEDGEMENT
FOR TRANSMISSION TO THE NODE ON A CHANNEL
DESIGNATED IN THE HEADER OF THE DATA PACKET
1004

FIG. 10

POWER AND RESOURCE EFFICIENT APPDU BASED APPROACH WITH SCHEDULED BLOCK ACKS FOR WLAN

CLAIM OF PRIORITY UNDER 35 U.S.C. §119

The present Application for Patent claims priority to Provisional Application No. 61/090,521 entitled "A POWER AND RESOURCE EFFICIENT APPDU BASED APPROACH WITH SCHEDULED BLOCK ACKS FOR WLAN" filed Aug. 20, 2008, and assigned to the assignee hereof and hereby expressly incorporated by reference herein.

BACKGROUND

I. Field

The following description relates generally to communication systems, and more particularly to power and resource efficiency in a wireless network.

II. Background

In order to address the issue of increasing bandwidth requirements that are demanded for wireless communications systems, different schemes are being developed to allow multiple user terminals to communicate with a single access point by sharing the channel resources while achieving high data throughputs. Multiple Input or Multiple Output (MIMO) technology represents one such approach that has recently emerged as a popular technique for the next generation communication systems. MIMO technology has been adopted in several emerging wireless communications standards such as the Institute of Electrical Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters). MIMO technology holds great promise for wireless communication systems of the future. However, there is still a need to further increase data throughput within MIMO applications, as well as other communication technologies.

SUMMARY

In one aspect of the disclosure, an apparatus includes a processing system configured to generate a data packet for transmission to a node, wherein the data packet includes a header and data, the processing system being further configured to embed in the header of the data packet a channel designation for the node to send an acknowledgement to the apparatus.

In another aspect of the disclosure, an apparatus includes a processing system configured to receive a data packet from a node, wherein the data packet includes a header and data, the processing system being further configured to generate an acknowledgement for transmission to the node on a channel designated in the header of the data packet.

In still another aspect of the disclosure, a method for communication includes generating a data packet for transmission to a node, wherein the data packet includes a header and data; and embedding in the header of the data packet a channel designation for the node to send an acknowledgement.

Another aspect of the disclosure includes a method for communication, including receiving a data packet from a node, wherein the data packet includes a header and data; and generating an acknowledgement for transmission to the node on a channel designated in the header of the data packet.

In yet another aspect of the disclosure, an apparatus for communication includes means for generating a data packet for transmission to a node, wherein the data packet includes a header and data; and means for embedding in the header of the data packet a channel designation for the node to send an acknowledgement.

In another aspect of the disclosure, an apparatus for communication includes means for receiving a data packet from a node, wherein the data packet includes a header and data; and means for generating an acknowledgement for transmission to the node on a channel designated in the header of the data packet.

In another aspect of the disclosure, an apparatus for communication includes means for receiving a physical layer packet from a node; and means for providing a plurality of MAC packets in the physical layer packet; wherein one of the MAC packets includes a transmission schedule associated with the other MAC packets in the physical layer packet.

In another aspect of the disclosure, a computer-program product for communication includes a machine-readable medium encoded with instructions executable to: generate a data packet for transmission to a node, wherein the data packet includes a header and data; and embed in the header of the data packet a channel designation for the node to send an acknowledgement to the processing system.

In another aspect of the disclosure, a computer-program product for communication includes a machine-readable medium encoded with instructions executable to: receive a data packet from a node, wherein the data packet includes a header and data; and generate an acknowledgement for transmission to the node on a channel designated in the header of the data packet.

In another aspect of the disclosure, an access point includes a processing system configured to generate a data packet for transmission to a node, wherein the data packet comprises a header and data, the processing system being further configured to embed in the header of the data packet a channel designation for the node to send an acknowledgement to the processing system; and a wireless network adapter configured to support a backhaul connection for a peer node to a network.

In another aspect of the disclosure, an access terminal includes a processing system configured to receive a data packet from a node, wherein the data packet comprises a header and data, the processing system being further configured to generate an acknowledgement for transmission to the node on a channel designated in the header of the data packet; and a user interface supported by the processing system.

In still another aspect of the disclosure, an apparatus for communication includes a processing system configured to generate a physical layer packet for transmission to a node, the physical layer packet having a block of one or more MAC packets, wherein the physical layer packet further comprises a channel designation for the node to send an acknowledgement of the block to the apparatus.

BRIEF DESCRIPTION OF THE DRAWINGS

These and other sample aspects of the invention will be described in the detailed description that follow, and in the accompanying drawings, wherein:

FIG. 9 is a block diagram illustrating an example of the functionality of an apparatus for communication according to an embodiment of the invention; and FIG. 10 is a block diagram illustrating an example of the functionality of an apparatus for communication 1000 according to another embodiment of the invention.

Figure 1:
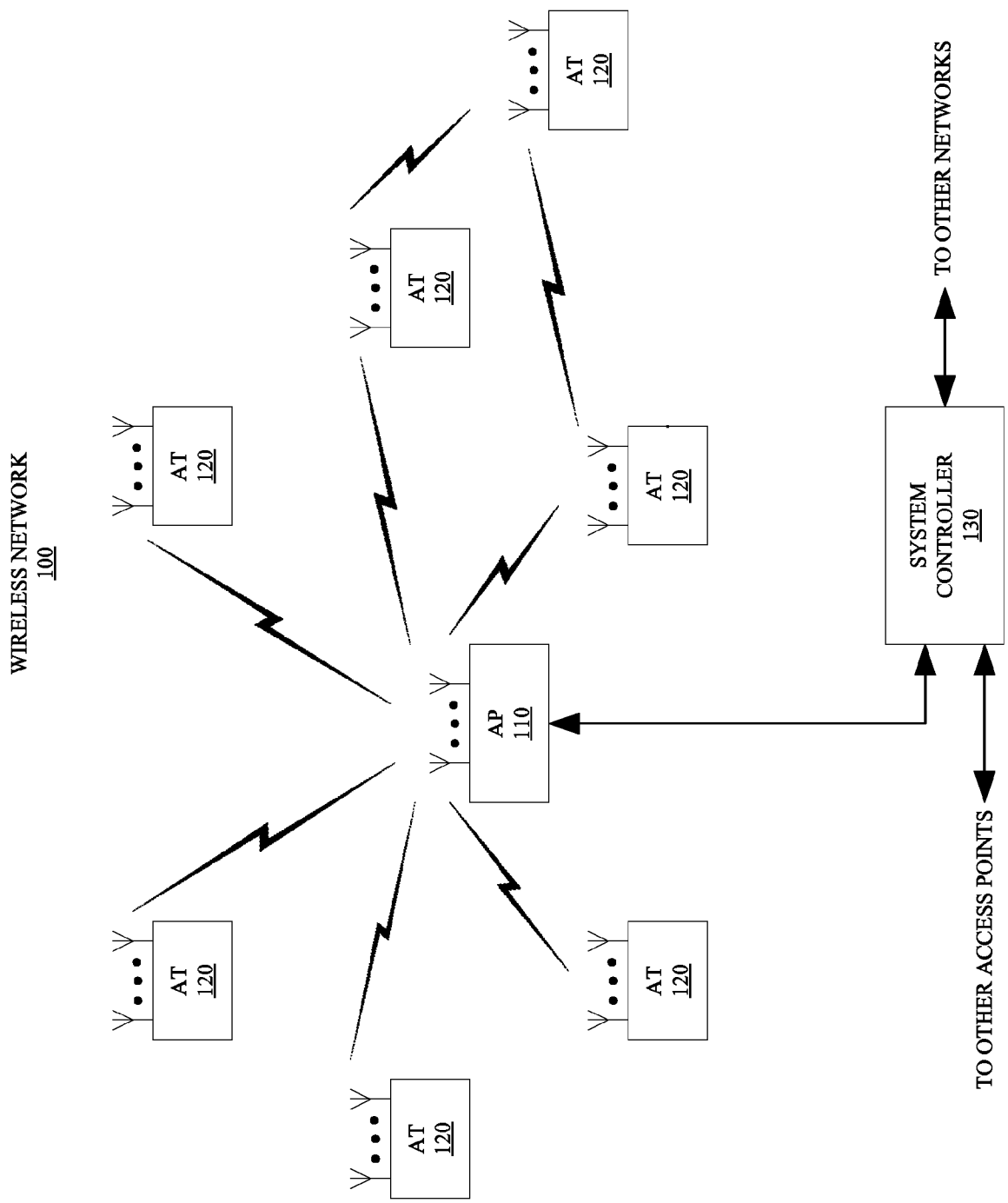
FIG. 1 is a diagram of a wireless communications network.

In accordance with common practice, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the invention are described more fully hereinafter with reference to the accompanying drawings. This invention may, however, be embodied in many different forms and should not be construed as limited to any specific structure or function presented throughout this disclosure. Rather, these aspects are provided so that this disclosure will be thorough and complete, and will fully convey the scope of the invention to those skilled in the art. Based on the teachings herein one skilled in the art should appreciate that that the scope of the invention is intended to cover any aspect of the invention disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect of the invention disclosed herein may be embodied by one or more elements of a claim.

Several aspects of a wireless network will now be presented with reference to FIG. 1. The wireless network 100 is shown with several wireless nodes, generally designated as nodes 110 and 120. Each wireless node is capable of receiving and/or transmitting. In the discussion that follows the term "receiving node" may be used to refer to a node that is receiving and the term "transmitting node" may be used to refer to a node that is transmitting. Such a reference does not imply that the node is incapable of performing both transmit and receive operations.

In the detailed description that follows, the term "access point" is used to designate a transmitting node and the term "access terminal" is used to designate a receiving node for downlink communications, whereas the term "access point" is used to designate a receiving node and the term "access terminal" is used to designate a transmitting node for uplink communications. However, those skilled in the art will readily understand that other terminology or nomenclature may be used for an access point and/or access terminal. By way of example, an access point may be referred to as a base station, a base transceiver station, a station, a terminal, a node, an access terminal acting as an access point, or some other suitable terminology. An access terminal may be referred to as a user terminal, a mobile station, a subscriber station, a station, a wireless device, a terminal, a node, or some other suitable terminology. The various concepts described throughout this disclosure are intended to apply to all suitable wireless nodes regardless of their specific nomenclature.

The wireless network 100 may support any number of access points distributed throughout a geographic region to provide coverage for access terminals 120. A system controller 130 may be used to provide coordination and control of the access points, as well as access to other networks (e.g., Internet) for the access terminals 120. For simplicity, one access point 110 is shown. An access point is generally a fixed terminal that provides backhaul services to access terminals in the geographic region of coverage; however, the access point may be mobile in some applications. An access terminal, which may be fixed or mobile, utilizes the backhaul services of an access point or engages in peer-to-peer communications with other access terminals. Examples of access terminals include a telephone (e.g., cellular telephone), a laptop computer, a desktop computer, a Personal Digital Assistant (PDA), a digital audio player (e.g., MP3 player), a camera, a game console, or any other suitable wireless node.

The wireless network 100 may support MIMO technology. Using MIMO technology, an access point 110 may communicate with multiple access terminals 120 simultaneously using Spatial Division Multiple Access (SDMA). SDMA is a multiple access scheme which enables multiple streams transmitted to different receivers at the same time to share the same frequency channel and, as a result, provide higher user capacity. This is achieved by spatially precoding each data stream on the downlink. The spatially precoded data streams arrive at the access terminals with different spatial signatures, which enables each access terminal 120 to recover the data stream destined for that access terminal 120. On the uplink, each access terminal 120 transmits a spatially precoded data stream, which enables the access point 110 to identify the source of each spatially precoded data stream.

One or more access terminals 120 may be equipped with multiple antennas to enable certain functionality. With this configuration, multiple antennas at the access point 110 may be used to communicate with a multiple antenna access terminal to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

While portions of the following disclosure will describe access terminals that also support MIMO technology, the access point 110 may also be configured to support access terminals that do not support MIMO technology. This approach may allow older versions of access terminals (i.e., "legacy" terminals) to remain deployed in a wireless network, extending their useful lifetime, while allowing newer MIMO access terminals to be introduced as appropriate.

In the detailed description that follows, various aspects of the invention will be described with reference to a MIMO system supporting any suitable wireless technology, such as Orthogonal Frequency Division Multiplexing (OFDM). OFDM is a technique that distributes data over a number of subcarriers spaced apart at precise frequencies. The spacing provides "orthogonality" that enables a receiver to recover the data from the subcarriers. An OFDM system may implement IEEE 802.11, or some other air interface standard. Other suitable wireless technologies include, by way of example, Code Division Multiple Access (CDMA), Time Division Multiple Access (TDMA), or any other suitable wireless technology, or any combination of suitable wireless technologies. A CDMA system may implement with IS-2000, IS-95, IS-856, Wideband-CDMA (WCDMA), or some other suitable air interface standard. A TDMA system may implement Global System for Mobile Communications (GSM) or some other suitable air interface standard. As those skilled in the art will readily appreciate, the various aspects of this invention are not limited to any particular wireless technology and/or air interface standard.

Figure 2:
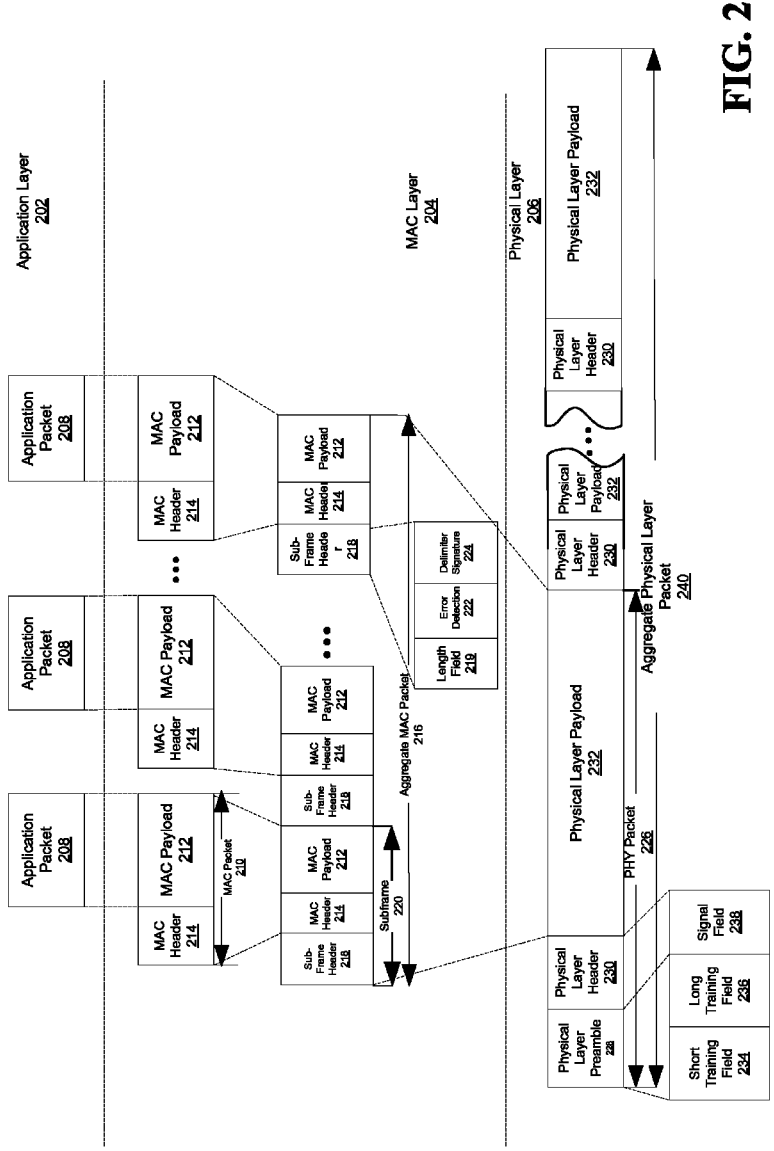
FIG. 2 illustrates frame aggregation in MAC and PHY layers of a wireless node in the wireless communications network of FIG. 2.

A wireless node, whether an access point (AP) or access terminal (AT), may be implemented with a protocol that utilizes a layered structure. By way of example, as shown in FIG. 2, a layered structure may include an application layer 202, a Medium Access Control layer (MAC) 204 and a physical layer (PHY) 206. The physical layer 206 implements all the physical and electrical specifications to interface the wireless node to the shared wireless channel. The MAC layer 204 coordinates access to the shared wireless channel and is used to interface higher layers, such as the application layer 202, to the physical layer 206. The application layer 202 performs various data processing functions including, by way of example, speech and multimedia codecs and graphics processing. Additional protocol layers (e.g., network layer, transport layer) may be required for any particular application. In some configurations, the wireless node may act as a relay point between an access point and an access terminal, or two access terminals, and therefore, may not require an application layer. Those skilled in the art will be readily able to implement the appropriate protocol for any wireless node depending on the particular application and the overall design constraints imposed on the overall system. The term "data packet" as used herein is to be construed broadly as any of a MAC packet, an aggregate MAC packet (described below), a physical layer payload (also described below), a packet received from the application layer, fragments and/or combinations of other packets, a frame, packet, timeslot, segment, or any other suitable nomenclature.

When the wireless node is in a transmit mode, the application layer 202 processes data, segments the data into packets 208, and provides the data packets 208 to the MAC layer 204. The MAC layer 204 assembles MAC packets 210 with each data packet 208 from the application layer 202 being carried by the payload 212 of a MAC packet 210. Each MAC packet 210 includes a MAC header 214 appended to the payload 212. The MAC packet 210 is sometimes referred to as a MAC Protocol Data Unit (MPDU), but may also be referred to as a frame, packet, timeslot, segment, or any other suitable nomenclature. Although FIG. 2 shows one application layer data packet 208 per MAC packet 210, it is also possible to incorporate multiple application layer data packets into the payload of one MAC packet. Alternatively, multiple application layer data packets may be fragmented and distributed over more than one MAC packet.

Multiple MAC packets 210 having a same destination address may be combined into one aggregate MAC packet 216. An aggregate MAC packet 216 is sometimes referred to as an aggregate MAC protocol data unit (AMPDU). Each MAC packet 210 in the aggregate MAC packet 216 is appended with a subframe header 218. A MAC packet appended with a subframe header as shown in FIG. 2 is referred to herein simply as a subframe 220. The aggregate MAC packet 216 may be made up of several such subframes 220. Each subframe header 218 may include a length field 219, error detection 222, and a delimiter signature 224. The beginning and end of each subframe 220 may be determined by the length field 219 and delimiter signature 224. The error detection may comprise a cyclic redundancy check, a checksum, or any other suitable error detection code that enables verification of respective subframes 220 independently. MAC-level frame aggregation as described above allows for the removal of spaces between MAC packets (inter-frame spaces) as well as the removal of redundancies in the MAC headers (header compression). For example, if each MAC packet 210 in an aggregate MAC packet 216 is to be transmitted to the same receiving node, the destination address may be eliminated from the MAC headers 214 of the subframes 220 following the first subframe in the aggregate MAC packet 216.

Although FIG. 2 shows one MAC packet per subframe, each subframe may include more than one MAC packet. Alternatively, multiple MAC packets may be fragmented and distributed over more than one subframe. In some cases, although the subframes 220 in the aggregate MAC packet 216 are to be transmitted to the same receiving node, they are not required to have the same source address.

When the MAC layer 204 decides to transmit, it provides the aggregate MAC packet 216 to the PHY layer 206. The PHY layer assembles a PHY packet 226 by appending a preamble (sometimes referred to as a Physical Layer Convergence Protocol (PLCP)) 228 and a header 230 to the payload 232 carrying the aggregate MAC packet. The PHY packet is sometimes referred to as a Physical Layer Protocol Data Unit (PPDU), but may also be referred to as a frame, packet, timeslot, segment, or any other suitable nomenclature. The preamble may include at least one Short Training Field (STF) 234 and at least one Long Training Field (LTF) 236. The STF and LTF may be used by a receiving node for detecting the start of the PHY packet 226, synchronizing to the transmitter's node data clock, performing channel estimation, calculating the AGC gain, and in some cases, estimating spatial streams in networks supporting MIMO technology. The header 230 may include a Signal Field (SIG) 238. The SIG field 238 may include information regarding the data rate and length of the payload 232.

The PHY packet 226 shown in FIG. 2 may be assembled into an aggregate PHY packet 240. The aggregate PHY packet 240 includes a PHY preamble 228 including an STF 234 and an LTF 236. Following the preamble 228 are three (although fewer or more than three are possible) PHY payloads 232, each one of which is preceded by a corresponding PHY header 230 including a SIG 238. Each of the PHY payloads 232 includes an aggregate MAC packet 216. As explained above, each MAC packet 210 in an aggregate MAC packet 216 is delivered to the same receiving node. However, each of the PHY layer payloads 232 in the aggregate PHY packet 240 may be transmitted to the same or different receiving nodes. The SIG 238 is provided before each PHY layer payload 232 to allow each aggregate MAC packet 216 to be transmitted at a different data rate. However, only one PHY layer preamble 228 is required for the entire aggregate PHY packet 240. Hence, only one PHY layer preamble 228 is required for multiple aggregate MAC packets 216, even if they are being transmitted to different receiving nodes. All receiving nodes can estimate the channel, synchronize and calculate the AGC gain using one preamble. Combining PHY layer payloads in an aggregate PHY packet allows for removal of inter frame spacing between aggregate MAC packets as well as aggregation of the preambles (training fields) for multiple aggregate MAC packets.

Although FIG. 2 shows one aggregate MAC packet per PHY layer payload, each PHY layer payload may include more than one aggregate MAC packet. Alternatively, one or more aggregate MAC packets may be fragmented and distributed over more than one PHY layer payload.

As will be discussed in greater detail later, the PHY layer 206 is also responsible for providing various signal processing functions (e.g., modulating, coding, spatial processing, etc.).

When the wireless node is in a receive mode, the process described above is reversed. That is, the PHY layer 206 detects an incoming aggregate PHY packet 240 from the wireless channel. The preamble 228 allows the PHY layer 206 to lock in on the aggregate PHY packet 240 and perform various signal processing functions (e.g., demodulating, decoding, spatial processing, etc.). Once processed, the PHY layer 206 recovers the aggregate MAC packets 216 carried in the payloads 232 of the aggregate PHY packet 240 and provides the aggregate MAC packets 216 to the MAC layer 204.

The MAC layer 204 recovers the aggregate MAC packets 216 with the source address for the receiving node in one or more of the MAC headers 214. The MAC layer 204 then checks the error detection code for each of the MAC packets 210 in the recovered aggregate MAC packets 216 to determine whether it was successfully decoded. If the error detection code for a MAC packet 210 indicates that it was successfully decoded, then the payload 212 for the MAC packet is provided to the application layer 202. If the error detection code for a MAC packet 210 indicates that it was unsuccessfully decoded, the MAC packet 210 is discarded.

In order to determine whether MAC packets 210 in an aggregate MAC packet 216 were received and decoded successfully, the transmitting node may send an acknowledgment (ACK) request to the receiving node. The ACK request may take the form of a Block ACK Request (BAR) which requests the receiving node to acknowledge every MAC packet 210 transmitted in the aggregate MAC packet 216. In response to a BAR, the receiving node responds with a Block ACK (BA) indicating which MAC packets 210 in the aggregate MAC packet 216 were successfully decoded. The transmitting node uses the BA to determine which MAC packets 210, if any, require retransmission.

Figure 3:
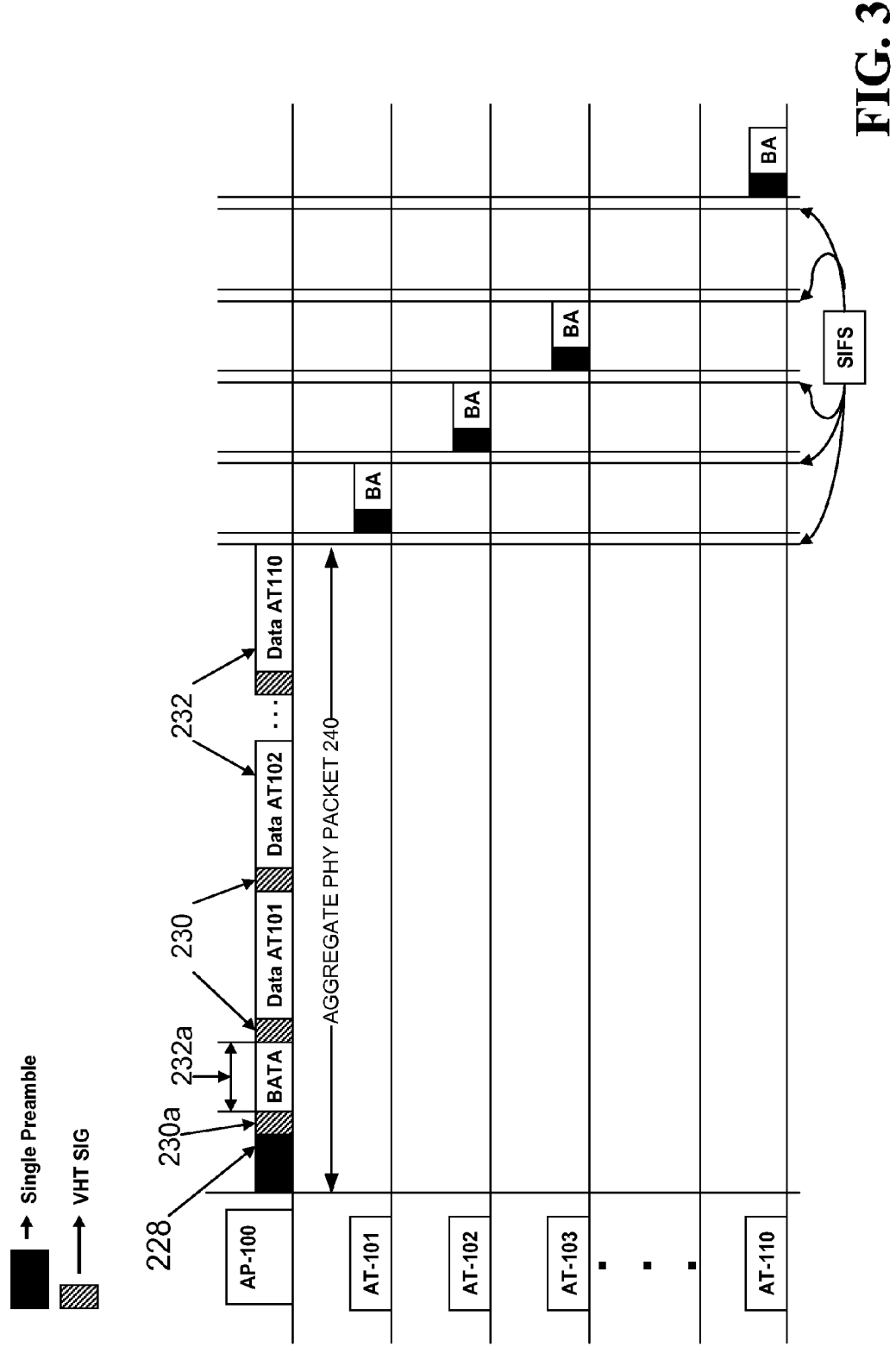
FIG. 3 illustrates an example of aggregated data transmission with scheduled block acknowledgements.

Alternatively, the transmitting node (labeled as AP 100 in the example described below with respect to FIG. 3) can specify a schedule of BAs for all receiving nodes. By way of example, as shown in FIG. 3, an aggregate PHY packet may be configured to carry a schedule for the BAs in one of the PHY payloads 232a. The schedule may be provided to each receiving node (labeled as ATs 101-110 in FIG. 3) with a channel designation for transmitting the BA. The channel designation may include transmission time, frequency channel, code channel, and/or some other suitable or desirable channel designation. In one configuration of a wireless network, the channel designation is a schedule of transmission times for the receiving nodes to send back BAs to the transmitting node. This schedule will be referred to herein as a Block ACK Time Assignment (BATA). The BATA carried in the PHY payload 232a is preceded by the PHY preamble 228 of the aggregate PHY packet 240 and a header 230a directed to the BATA. The header 230a may include a designation indicating a data rate for transmission of the BATA. The BATA is transmitted to each node receiving an aggregate MAC packet carried in the payload 232 of the aggregate PHY packet 240 and includes a schedule of Block ACK channel designations for each station. In response to the BATA, each receiving node sends a BA back to the transmitting node at its scheduled time. By including the BATA in the aggregate PHY packet 240, it is not necessary for the transmitting node to send a separate BAR to each receiving node, thereby reducing overhead and transmission time, and eliminating inter-frame spacing between BARs that might otherwise be required.

Figure 4:
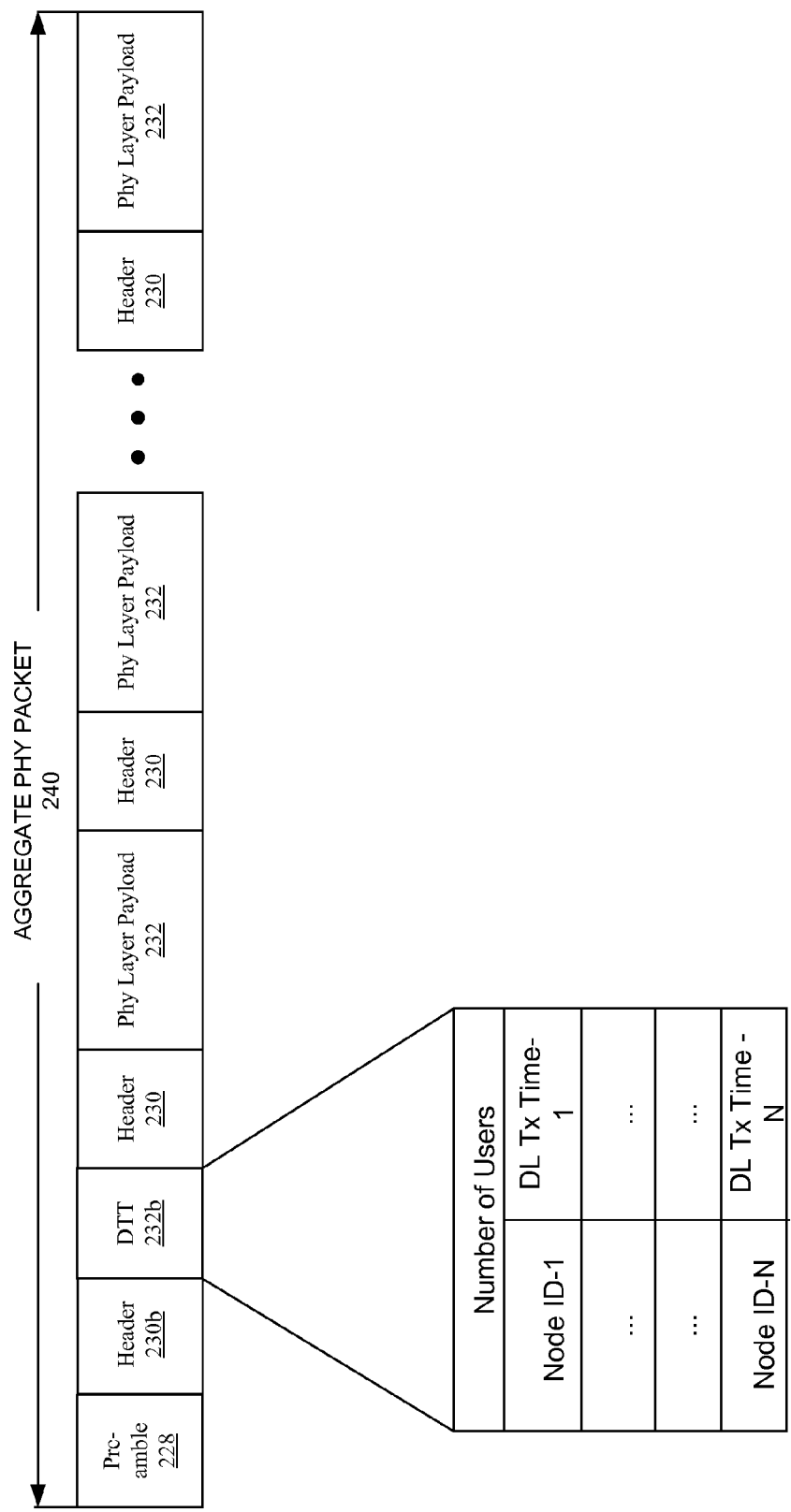
FIG. 4 illustrates a DTT payload in a segment of a wireless node in the wireless communications network of FIG. 1.

In some configurations of a node, a Data Transmission Time (DTT) schedule may be transmitted to each receiving node. The DTT may be included as the first PHY payload in the aggregate PHY packet. By way of example, FIG. 4 shows a DTT in the payload 232b of an aggregate PHY packet 240. The DTT follows the PHY preamble 228 and includes a header 230b comprising a SIG indicating a data rate for transmission of the DTT. The DTT includes a DTT Table, which includes the receiving nodes for the aggregate PHY packet 240, a node identification (NodeID) field identifying each receiving node with a unique NodeID and a data transmission time field including a unique transmission time for each receiving node identified in the NodeID field. By knowing when to expect a transmission, it is possible for each receiving node to power down most functions (i.e., "go to sleep") until it is time to receive a transmission, thereby achieving significant power savings.

In some configurations of a node, the BATA can be a PHY packet, or distributed as part of MAC packets, while the DTT may be transmitted as a PHY payload in the aggregate PHY packet.

Figure 5:
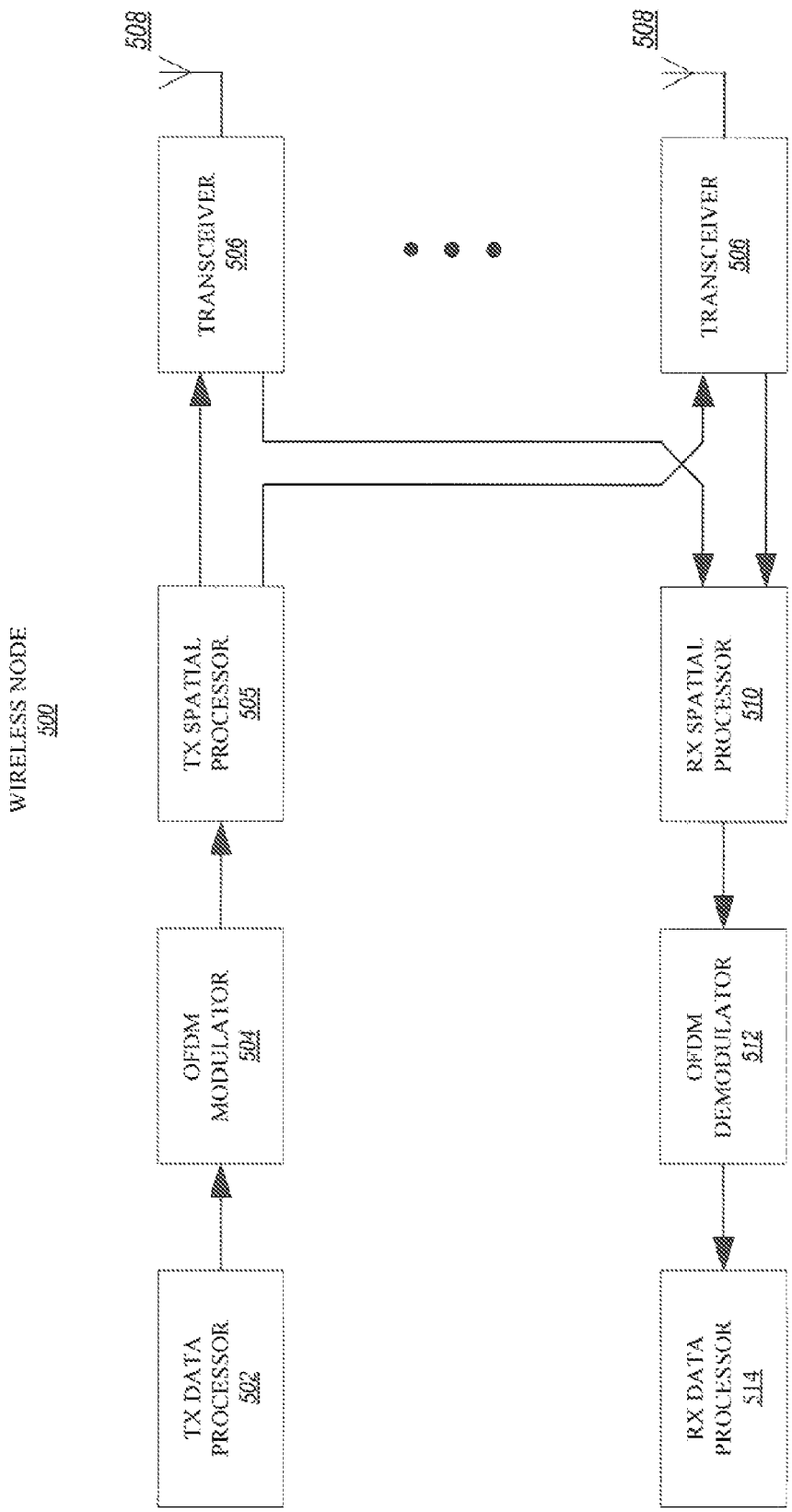
FIG. 5 is a block diagram of an example of signal processing functions of a PHY layer of a wireless node in the wireless communications network of FIG. 1.

FIG. 5 is a conceptual block diagram illustrating an example of the signal processing functions of the PHY layer. In a transmit mode, a TX data processor 502 may be used to receive data from the MAC layer and encode (e.g., Turbo code) the data to facilitate forward error correction (FEC) at the receiving node. The encoding process results in a sequence of code symbols that that may be blocked together and mapped to a signal constellation by the TX data processor 502 to produce a sequence of modulation symbols.

In wireless nodes implementing OFDM, the modulation symbols from the TX data processor 502 may be provided to an OFDM modulator 504. The OFDM modulator splits the modulation symbols into parallel streams. Each stream is then mapped to an OFDM subcarrier and then combined together using an Inverse Fast Fourier Transform (IFFT) to produce a time domain OFDM stream.

A TX spatial processor 505 performs spatial processing on the OFDM stream. This may be accomplished by spatially precoding each OFDM and then providing each spatially precoded stream to a different antenna 508 via a transceiver 506. Each transceiver 506 modulates an RF carrier with a respective precoded stream for transmission over the wireless channel.

In a receive mode, each transceiver 506 receives a signal through its respective antenna 508. Each transceiver 506 may be used to recover the information modulated onto an RF carrier and provide the information to a RX spatial processor 510.

The RX spatial processor 510 performs spatial processing on the information to recover any spatial streams destined for the wireless node 500. The spatial processing may be performed in accordance with Channel Correlation Matrix Inversion (CCMI), Minimum Mean Square Error (MMSE), Soft Interference Cancellation (SIC), or some other suitable technique. If multiple spatial streams are destined for the wireless node 500, they may be combined by the RX spatial processor 510.

In wireless nodes implementing OFDM, the stream (or combined stream) from the RX spatial processor 510 is provided to an OFDM demodulator 512. The OFDM demodulator 512 converts the stream (or combined stream) from time-domain to the frequency domain using a Fast Fourier Transform (FFT). The frequency domain signal comprises a separate stream for each subcarrier of the OFDM signal. The OFDM demodulator 512 recovers the data (i.e., modulation symbols) carried on each subcarrier and multiplexes the data into a stream of modulation symbols.

A RX data processor 514 may be used to translate the modulation symbols back to the correct point in the signal constellation. Because of noise and other disturbances in the wireless channel, the modulation symbols may not correspond to an exact location of a point in the original signal constellation. The RX data processor 514 detects which modulation symbol was most likely transmitted by finding the smallest distance between the received point and the location of a valid symbol in the signal constellation. These soft decisions may be used, in the case of Turbo codes, for example, to compute a Log-Likelihood Ratio (LLR) of the code symbols associated with the given modulation symbols. The RX data processor 514 then uses the sequence of code symbol LLRs in order to decode the data that was originally transmitted before providing the data to the MAC layer.

Figure 6:
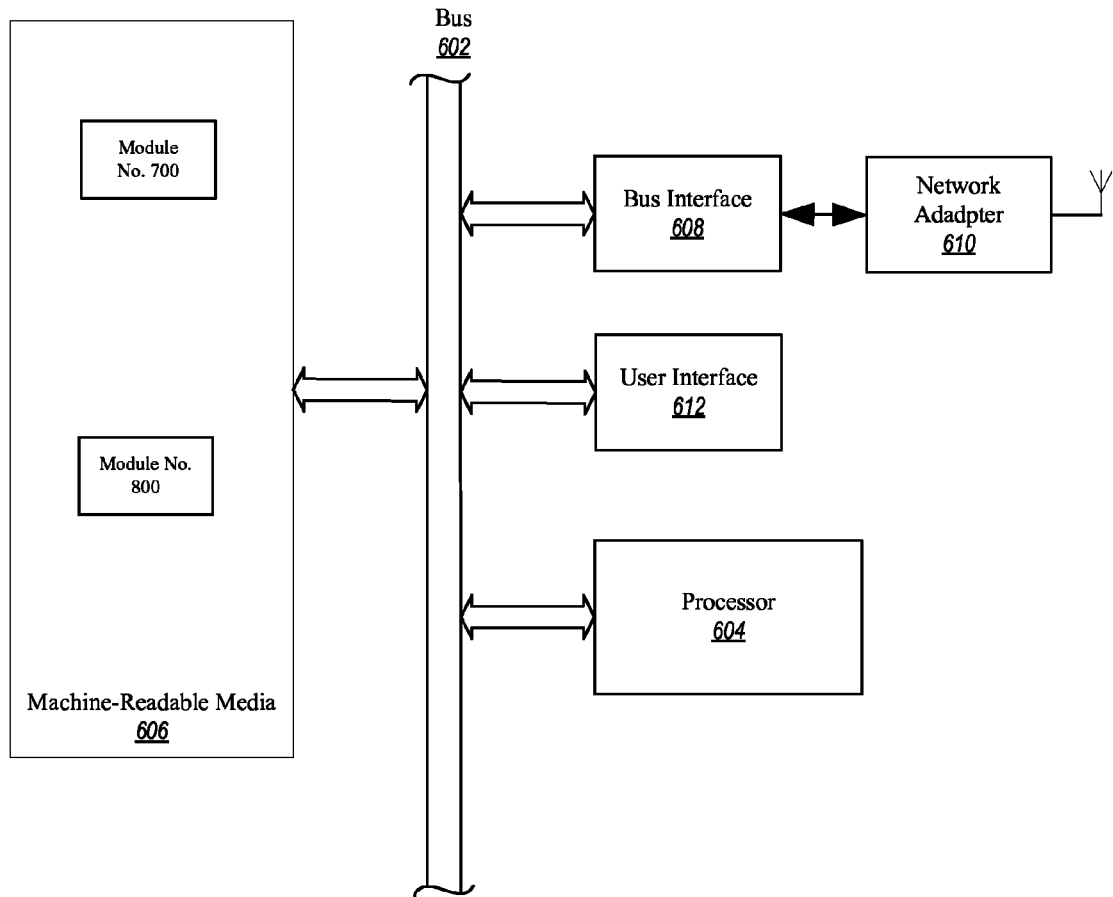
FIG. 6 is a block diagram illustrating an exemplary hardware configuration for a processing system in a wireless node in the wireless communications network of FIG. 1.

FIG. 6 is a conceptual diagram illustrating an example of a hardware configuration for a processing system in a wireless node. In this example, the processing system 600 may be implemented with a bus architecture represented generally by bus 602. The bus 602 may include any number of interconnecting buses and bridges depending on the specific application of the processing system 600 and the overall design constraints. The bus links together various circuits including a processor 604, machine-readable media 606, and a bus interface 608. The bus interface 608 may be used to connect a network adapter 610, among other things, to the processing system 600 via the bus 602. The network adapter 610 may be used to implement the signal processing functions of the PHY layer. In the case of an access terminal 110 (see FIG. 1), a user interface 612 (e.g., keypad, display, mouse, joystick, etc.) may also be connected to the bus. The bus 602 may also link various other circuits such as timing sources, peripherals, voltage regulators, power management circuits, and the like, which are well known in the art, and therefore, will not be described any further.

The processor 604 is responsible for managing the bus and general processing, including the execution of software stored on the machine-readable media 606. The processor 604 may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In the hardware implementation illustrated in FIG. 6, the machine-readable media 606 is shown as part of the processing system 600 separate from the processor 604. However, as those skilled in the art will readily appreciate, the machine-readable media 606, or any portion thereof, may be external to the processing system 600. By way of example, the machine-readable media 606 may include a transmission line, a carrier wave modulated by data, and/or a computer product separate from the wireless node, all which may be accessed by the processor 604 through the bus interface 608. Alternatively, or in addition to, the machine readable media 606, or any portion thereof, may be integrated into the processor 604, such as the case may be with cache and/or general register files.

The processing system 600 may be configured as a general-purpose processing system with one or more microprocessors providing the processor functionality and external memory providing at least a portion of the machine-readable media 606, all linked together with other supporting circuitry through an external bus architecture. Alternatively, the processing system 600 may be implemented with an ASIC (Application Specific Integrated Circuit) with the processor 604, the bus interface 608, the user interface 612 in the case of an access terminal), supporting circuitry (not shown), and at least a portion of the machine-readable media 606 integrated into a single chip, or with one or more FPGAs (Field Programmable Gate Array), PLDs (Programmable Logic Device), controllers, state machines, gated logic, discrete hardware components, or any other suitable circuitry, or any combination of circuits that can perform the various functionality described throughout this disclosure. Those skilled in the art will recognize how best to implement the described functionality for the processing system 600 depending on the particular application and the overall design constraints imposed on the overall system.

The machine-readable media 606 is shown with a number of software modules. The software modules include instructions that when executed by the processor 604 cause the processing system 600 to perform various functions. The software modules include a transmission module 700 and a receiving module 800. Each software module may reside in a single storage device or distributed across multiple storage devices. By way of example, a software module may be loaded into RAM from a hard drive when a triggering event occurs. During execution of the software module, the processor 604 may load some of the instructions into cache to increase access speed. One or more cache lines may then be loaded into a general register file for execution by the processor 604. When referring to the functionality of a software module below, it will be understood that such functionality is implemented by the processor 604 when executing instructions from that software module.

Figure 7:
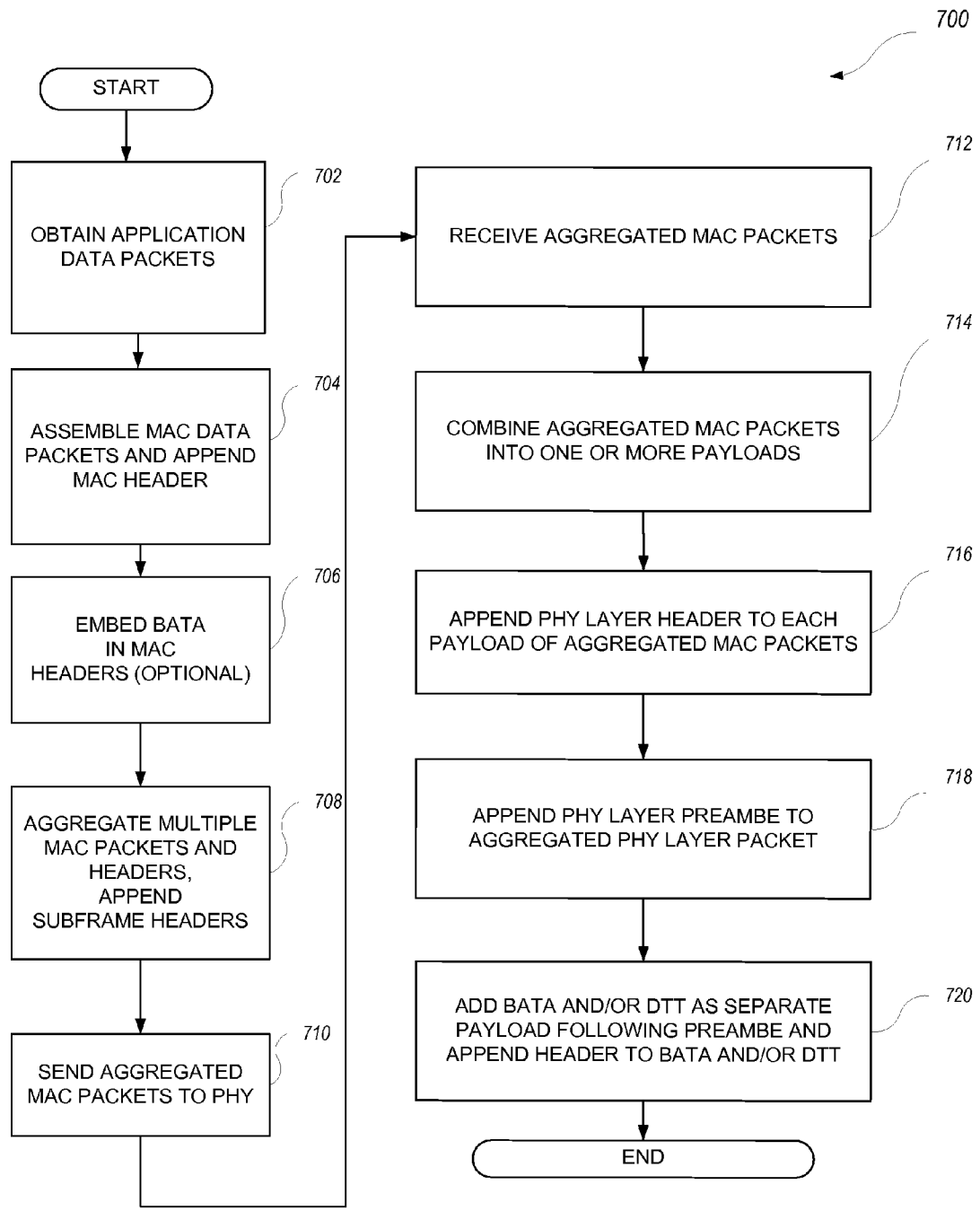
FIGS. 7 and 8 are flow charts illustrating functionality of software modules with respect to various aspects disclosed in FIGS. 2-6.

FIG. 7 is a flow chart illustrating an example of the functionality of the transmission module. The transmission module 700 may be used to obtain data packets from the application layer (S702), assemble the data packets into MAC packets by fragmenting and/or concatenating data packets and appending a MAC header to each MAC packet (S704), as shown in FIG. 2. The transmission module 700 may embed a BATA in one or more of the MAC packets, such as in one or more of the MAC packet headers (S706). As also shown in FIG. 2, the transmission module 700 generates multiple subframes by appending a subframe header to each of the MAC packets and packaging the subframes into aggregate MAC packets (S708). The transmission module 700 sends the aggregated MAC packets to the PHY layer (S710).

The PHY layer receives the aggregated MAC packets (S712) and may be used to package multiple aggregated MAC packets into an aggregate PHY packet by: optionally fragmenting and/or concatenating aggregated MAC packets; combining aggregated MAC packets (including fragments if appropriate) into one or more PHY payloads (S714); appending a PHY layer header to each PHY payload (S716); and appending a preamble to the beginning of the aggregated PHY packet (S718). If the BATA is not embedded in one or more of the MAC packets, the transmission module 700 may include the BATA as a payload of the aggregated PHY packet and append a header to the PHY payload carrying the BATA (S720). The transmission module 700 may also add a DTT as a separate PHY payload following the PHY preamble, and append a header to the PHY payload carrying the DTT (S720). The transmission module 700 then provides the aggregated PHY packet to the bus interface 608 for delivery to the network adaptor 610 for transmission over the wireless channel (see FIG. 6). If included, the DTT may be the first payload of the PHY packet.

Figure 8:
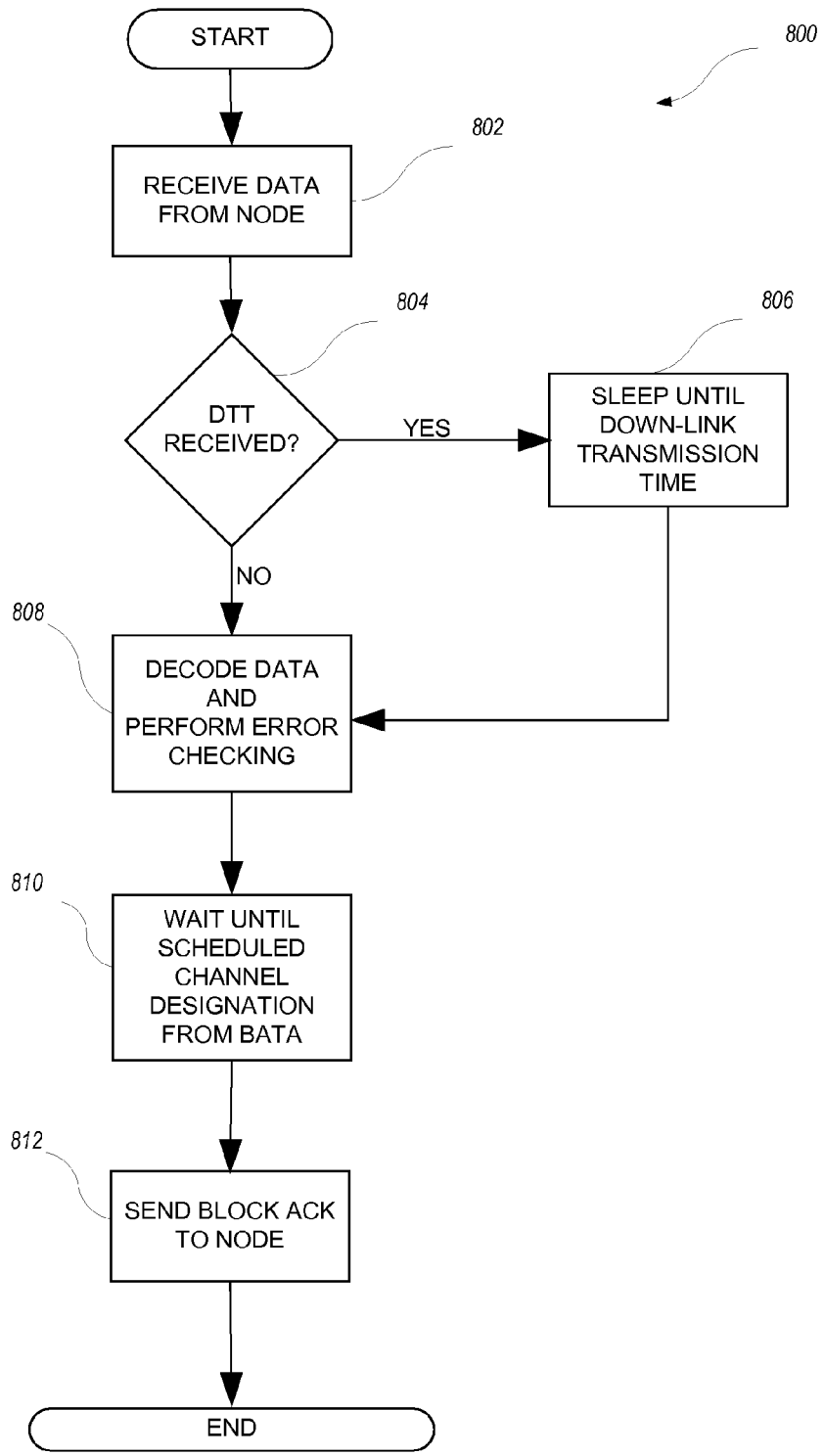

FIG. 8 is a flow chart illustrating an example of the functionality of the receiving module. The software module 800, as shown in FIG. 8, may be used to receive aggregate PHY packets including a BATA from the network adapter 610 via the bus interface 608 (see FIG. 6) (S802). The module 800 checks to see whether a DTT has been received (S804). If a DTT has been received (as shown in FIG. 4, for example), the module 800 reserves resources by going to sleep until the scheduled time to receive a transmission (S806). At the scheduled time, the module 800 decodes the received aggregate PHY packets and performs error detection on the MAC packets in the aggregated PHY packets addressed to the receiving node (S808). The module 800 then waits until the allotted time indicated in the BATA (S810) and sends a BA to the network adaptor 610 (see FIG. 6) at the allotted time, as shown in FIG. 3 (S812).

FIG. 9 is a block diagram illustrating an example of the functionality of an apparatus for communication 900 according to an embodiment of the invention. The apparatus includes a processing system having a module 902 for generating a data packet for transmission to a node, wherein the data packet comprises a header and data, and a module 904 for embedding in the header of the data packet a channel designation for the node to send an acknowledgement.

FIG. 10 is a block diagram illustrating an example of the functionality of an apparatus for communication 1000 according to another embodiment of the invention. The apparatus includes a processing system having a module 1002 for receiving a data packet from a node, wherein the data packet comprises a header and data, and a module 1004 for generating an acknowledgement for transmission to the node on a channel designated in the header of the data packet.

It is understood that any specific order or hierarchy of steps described in the context of a software module is being presented to provide an example of a wireless node. Based upon design preferences, it is understood that the specific order or hierarchy of steps may be rearranged while remaining within the scope of the invention.

Although various aspects of the invention have been described as software implementations, those skilled in the art will readily appreciate that the various software modules presented throughout this disclosure may be implemented in hardware, or any combination of software and hardware. Whether these aspects are implemented in hardware or software depends upon the particular application and design constraints imposed on the overall system. Skilled artisans may implement the described functionality in varying ways for each particular application, but such implementation decisions should not be interpreted as causing a departure from the scope of the invention.

The previous description is provided to enable any person skilled in the art to fully understand the full scope of the invention. Modifications to the various configurations disclosed herein will be readily apparent to those skilled in the art. Thus, the claims are not intended to be limited to the various aspects of the invention described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An apparatus for communication, comprising:
   a processing system configured to:
      generate a Medium Access Control (MAC) packet for transmission to a node, wherein the MAC packet comprises a header,
      embed in the header of the MAC packet a channel designation portion for the node to send an acknowledgement to the apparatus, wherein the channel designation portion comprises a time assignment for the node to send the acknowledgement,
      generate a physical layer packet,
      insert a schedule into a first payload of the physical layer packet, wherein the schedule comprises a transmission time for the MAC packet and a node identification identifying the node,
      insert the MAC packet into a second payload of the physical layer packet, and
      append a training sequence to the first and second payloads of the physical layer packet.

2. The apparatus of claim 1 wherein the processing system is further configured to aggregate the MAC packet with one or more other MAC packets to generate an aggregated MAC packet, wherein the aggregated MAC packet is inserted into the second payload of the physical layer packet.

3. The apparatus of claim 2 wherein each of the one or more other MAC packets comprises a header, the processing system being further configured to embed in the header of each of the one or more other MAC packets a channel designation for the node to send an acknowledgement.

4. The apparatus of claim 2 wherein the processing system is further configured to embed in the header of the MAC packet a request for a block acknowledgement for the MAC packet and the one or more other MAC packets.

5. The apparatus of claim 1 wherein the processing system is further configured to embed in the header of the MAC packet a request for an acknowledgement for the MAC packet.

6. The apparatus of claim 1 wherein the MAC packet comprises data.

7. An apparatus for communication, comprising:
   a processing system configured to:
      generate a Medium Access Control (MAC) packet for transmission to a node, wherein the MAC packet comprises a header,
      embed in the header of the MAC packet a channel designation portion for the node to send an acknowledgement to the apparatus, wherein the channel designation portion comprises a time assignment for the node to send the acknowledgement,
embed in the header of the MAC packet a designation indicating a data rate for the node to send the acknowledgement,
generate a physical layer packet,
insert the MAC packet into a payload of the physical layer packet, and
append a training sequence to the payload of the physical layer packet.

8. An apparatus, comprising:
a receiver configured to receive a physical layer packet from a node using a training sequence of the physical layer packet, wherein the physical layer packet comprises a schedule carried in a first payload of the physical layer packet and a Medium Access Control (MAC) packet carried in a second payload of the physical layer packet, and the schedule comprises a transmission time for the MAC packet and an identification identifying the apparatus; and
a processing system configured to:
recover the schedule carried in the first payload of the physical layer packet,
recover the MAC packet carried in the second payload of the physical layer packet at the transmission time for the MAC packet in the schedule, wherein the MAC packet comprises a header, and
generate an acknowledgement for transmission to the node on a channel designated in a channel designation portion of the header of the MAC packet, wherein the channel designation portion comprises a transmission time for the apparatus to send the acknowledgement.

9. The apparatus of claim 8 wherein the processing system is further configured to sleep during a period of time between the processing system receiving the MAC packet and the transmission time for transmitting the acknowledgement to the node.

10. The apparatus of claim 8 wherein the receiver is further configured to receive an aggregated MAC packet comprising the MAC packet aggregated with one or more other MAC packets, wherein the aggregated MAC packet is carried in the second payload of the physical layer packet.

11. The apparatus of claim 10 wherein each of the one or more other MAC packets comprises a header, the processing system being further configured to generate an acknowledgement for transmission to the node for each of the one or more other MAC packets on the channel designated in the header of that MAC packet.

12. The apparatus of claim 10 wherein the acknowledgement comprises a block acknowledgement for the MAC packet and the one or more other MAC packets.

13. The apparatus of claim 10 wherein the acknowledgement comprises an acknowledgement for the MAC packet.

14. The apparatus of claim 8 wherein the processing system is further configured to sleep during a period of time between the processing system receiving the schedule and the transmission time for the MAC packet.

15. An apparatus, comprising:
a receiver configured to receive a physical layer packet from a node using a training sequence of the physical layer packet; and
a processing system configured to:
recover a Medium Access Control (MAC) packet carried in a payload of the physical layer packet, wherein the MAC packet comprises a header, and
generate an acknowledgement for transmission to the node on a channel designated in a channel designation portion of the header of the MAC packet and at a data rate designated in the header of the MAC packet, wherein the channel designation portion comprises a transmission time for the apparatus to send the acknowledgement.

16. A method for communication, comprising:
generating a Medium Access Control (MAC) packet for transmission to a node, wherein the MAC packet comprises a header;
embedding in the header of the MAC packet a channel designation portion for the node to send an acknowledgement, wherein the channel designation portion comprises a time assignment for the node to send the acknowledgement;
generating a physical layer packet;
inserting a schedule into a first payload of the physical layer packet, wherein the schedule comprises a transmission time for the MAC packet and a node identification identifying the node;
inserting the MAC packet into a second payload of the physical layer packet; and
appending a training sequence to the first and second payloads of the physical layer packet.

17. The method of claim 16 further comprising aggregating the MAC packet with one or more other MAC packets to generate an aggregated MAC packet, wherein the aggregated MAC packet is inserted into the second payload of the physical layer packet.

18. The method of claim 17 wherein each of the one or more other MAC packets comprises a header, the method further comprising embedding in the header of each of the one or more other MAC packets a channel designation for the node to send an acknowledgement.

19. The method of claim 17 further comprising embedding in the header of the MAC packet a request for a block acknowledgement for the MAC packet and the one or more other MAC packets.

20. The method of claim 16 further comprising embedding in the header of the MAC packet a request for an acknowledgement for the MAC packet.

21. A method for communication, comprising:
generating a Medium Access Control (MAC) packet for transmission to a node, wherein the MAC packet comprises a header;
embedding in the header of the MAC packet a channel designation portion for the node to send an acknowledgement, wherein the channel designation portion comprises a time assignment for the node to send the acknowledgement;
embedding in the header of the MAC packet a designation indicating a data rate for the node to send the acknowledgment;
generating a physical layer packet;
inserting the MAC packet into a payload of the physical layer packet; and
appending a training sequence to the payload of the physical layer packet.

22. A method for communication, comprising:
receiving a physical layer packet from a node using a training sequence of the physical layer packet, wherein the physical layer packet comprises a schedule carried in a first payload of the physical layer packet and a Medium Access Control (MAC) packet carried in a second payload of the physical layer packet, and the schedule comprises a transmission time for the MAC packet and an identification identifying an apparatus;

recovering the schedule carried in the first payload of the physical layer packet, recovering the MAC packet carried in the second payload of the physical layer packet at the transmission time for the MAC packet in the schedule, wherein the MAC packet comprises a header; and generating an acknowledgement for transmission to the node on a channel designated in a channel designation portion of the header of the MAC packet, wherein the channel designation portion comprises a transmission time for the apparatus to send the acknowledgement.

23. The method of claim 22 further comprising sleeping during a period of time between receiving the MAC packet and the transmission time for transmitting the acknowledgement to the node.

24. The method of claim 22 further comprising receiving an aggregated MAC packet comprising the MAC packet aggregated with one or more other MAC packets, wherein the aggregated MAC packet is carried in the second payload of the physical layer packet.

25. The method of claim 24 wherein each of the one or more other MAC packets comprises a header, the method further comprising generating an acknowledgement for transmission to the node for each of the one or more other MAC packets on the channel designated in the header of the each of the one or more other MAC packets.

26. The method of claim 24 wherein the acknowledgement comprises a block acknowledgement for the MAC packet and the one or more other MAC packets.

27. The method of claim 24 wherein the acknowledgement comprises an acknowledgement for the MAC packet.

28. A method for communication, comprising:

receiving a physical layer packet from a node using a training sequence of the physical layer packet;

recovering a Medium Access Control (MAC) packet carried in a payload of the physical layer packet, wherein the MAC packet comprises a header; and generating an acknowledgement for transmission to the node on a channel designated in a channel designation portion of the header of the MAC packet and at a data rate designated in the header of the MAC packet, wherein the channel designation portion comprises a transmission time for the apparatus to send the acknowledgement.

29. An apparatus for communication, comprising:

means for generating a Medium Access Control (MAC) packet for transmission to a node, wherein the MAC packet comprises a header;

means for embedding in the header of the MAC packet a channel designation portion for the node to send an acknowledgement, wherein the channel designation portion comprises a time assignment for the node to send the acknowledgement;

means for generating a physical layer packet;

means for inserting a schedule into a first payload of the physical layer packet, wherein the schedule comprises a transmission time for the MAC packet and a node identification identifying the node;

means for inserting the MAC packet into a second payload of the physical layer packet; and means for appending a training sequence to the first and second payloads of the physical layer packet.

30. The apparatus of claim 29 further comprising means for aggregating the MAC packet with one or more other MAC packets to generate an aggregated MAC packet, wherein the aggregated MAC packet is inserted into the second payload of the physical layer packet.

31. The apparatus of claim 30 wherein each of the one or more other MAC packets comprises a header, wherein the means for embedding is configured to embed in the header of each of the one or more other MAC packets a channel designation for the node to send an acknowledgement.

32. The apparatus of claim 31 further comprising means for embedding in the header of the MAC packet a request for a block acknowledgement for the MAC packet and the one or more other MAC packets.

33. The apparatus of claim 29 further comprising means for embedding in the header of the MAC packet a request for an acknowledgement for the MAC packet.

34. An apparatus for communication, comprising:

means for generating a Medium Access Control (MAC) packet for transmission to a node, wherein the MAC packet comprises a header;

means for embedding in the header of the MAC packet a channel designation portion for the node to send an acknowledgement, wherein the channel designation portion comprises a time assignment for the node to send the acknowledgement means for embedding in the header of the MAC packet a designation indicating a data rate for the node to send the acknowledgement;

means for inserting the MAC packet into a payload of a physical layer packet and means for appending a training sequence to the payload of the physical layer packet.

35. An apparatus for communication, comprising:

means for receiving a physical layer packet from a node using a training sequence of the physical layer packet, wherein the physical layer packet comprises a schedule carried in a first payload of the physical layer packet and a Medium Access Control (MAC) packet carried in a second payload of the physical layer packet, and the schedule comprises a transmission time for the MAC packet and an identification identifying the apparatus;

means for recovering the schedule carried in the first payload of the physical layer packet;

means for recovering the MAC packet carried in the second payload of the physical layer packet at the transmission time for the MAC packet in the schedule, wherein the MAC packet comprises a header; and means for generating an acknowledgement for transmission to the node on a channel designated in a channel designation portion of the header of the MAC packet, wherein the channel designation portion comprises a transmission time for the apparatus to send the acknowledgement.

36. The apparatus of claim 35 further comprising means for sleeping during a period of time between receiving the MAC packet and the transmission time for transmitting the acknowledgement to the node.

37. The apparatus of claim 35 further comprising means for receiving an aggregated MAC packet comprising the MAC packet aggregated with one or more other MAC packets, wherein the aggregated MAC packet is carried in the second payload of the physical layer packet.

38. The apparatus of claim 37 wherein each of the one or more other MAC packets comprises a header, wherein the means for generating an acknowledgement is configured to generate acknowledgment for transmission to the node for each of the one or more other MAC packets on the channel designated in the header of the each of the one or more other MAC packets.

39. The apparatus of claim 37 wherein the acknowledgement comprises a block acknowledgement for the MAC packet and the one or more other MAC packets.

40. The apparatus of claim 37 wherein the acknowledgement comprises an acknowledgement for the MAC packet.

41. An apparatus for communication, comprising:
means for receiving a physical layer packet from a node using a training sequence of the physical layer packet;
means for recovering a Medium Access Control (MAC) packet carried in a payload of the physical layer packet, wherein the MAC packet comprises a header; and
means for generating an acknowledgement for transmission to the node on a channel designated in a channel designation portion of the header of the MAC packet and at a data rate designated in the header of the MAC packet, wherein the channel designation portion comprises a transmission time for the apparatus to send the acknowledgement.

42. A computer-program product for communication, comprising:
a computer-readable storage device encoded with instructions executable to:
generate a Medium Access Control (MAC) packet for transmission to a node, wherein the MAC packet comprises a header;
embed in the header of the MAC packet a channel designation portion for the node to send an acknowledgement, wherein the channel designation portion comprises a time assignment for the node to send the acknowledgement;
generate a physical layer packet;
insert a schedule into a first payload of the physical layer packet, wherein the schedule comprises a transmission time for the MAC packet and a node identification identifying the node;
insert the MAC packet into a second payload of the physical layer packet, and
append a training sequence to the first and second payloads of the physical layer packet.

43. A computer-program product for communication, comprising:
a computer-readable storage device encoded with instructions executable to:
receive a physical layer packet from a node using a training sequence of the physical layer packet, wherein the physical layer packet comprises a schedule carried in a first payload of the physical layer packet and a Medium Access Control (MAC) packet carried in a second payload of the physical layer packet, and the schedule comprises a transmission time for the MAC packet and an identification identifying the apparatus;
recover the schedule carried in the first payload of the physical layer packet
recover the MAC packet carried in the second payload of the physical layer packet at the transmission time for the MAC packet in the schedule, wherein the MAC packet comprises a header; and
generate an acknowledgement for transmission to the node on a channel designated in a channel designation portion of the header of the MAC packet, wherein the channel designation portion comprises a transmission time for the apparatus to send the acknowledgement.

44. An access point, comprising:
a processing system configured to:
generate a Medium Access Control (MAC) packet for transmission to a node, wherein the MAC packet comprises a header,
embed in the header of the MAC packet a channel designation portion for the node to send an acknowledgement to the apparatus, wherein the channel designation portion comprises a time assignment for the node to send the acknowledgement,
generate a physical layer packet,
insert a schedule into a first payload of the physical layer packet, wherein the schedule comprises a transmission time for the MAC packet and a node identification identifying the node,
insert the MAC packet into a second payload of the physical layer packet, and
append a training sequence to the first and second payloads of the physical layer packet.

45. An access terminal, comprising:
a receiver configured to receive a physical layer packet from a node using a training sequence of the physical layer packet, wherein the physical layer packet comprises a schedule carried in a first payload of the physical layer packet and a Medium Access Control (MAC) packet carried in a second payload of the physical layer packet, and the schedule comprises a transmission time for the MAC packet and an identification identifying the apparatus;
a processing system configured to:
recover the schedule carried in the first payload of the physical layer packet.
recover the MAC packet carried in the second payload of the physical layer packet at the transmission time for the MAC packet in the schedule, wherein the MAC packet comprises a header, and
generate an acknowledgement for transmission to the node on a channel designated in a channel designation portion of the header of the MAC packet, wherein the channel designation portion comprises a transmission time for the apparatus to send the acknowledgement; and
a user interface supported by the processing system.

46. An apparatus for communication, comprising:
a processing system configured to generate a physical layer packet for transmission to a node, the physical layer packet having a block of one or more Medium Access Control (MAC) packets, wherein the physical layer packet further comprises a channel designation embedded in a header of the one or more MAC packets for the node to send an acknowledgement of the block to the apparatus, wherein the channel designation comprises a time assignment for the node to send the acknowledgement, and wherein the physical layer packet further comprises a training sequence, a schedule including a transmission time for the one or more MAC packets, and a node identification identifying the node.

47. The apparatus of claim 46 wherein the physical layer packet further comprises a designation indicating a data rate for transmission of the channel designation to the node.

48. The apparatus of claim 46 wherein the physical layer packet further comprises a designation indicating a data rate for transmission of the block to the node.

49. The apparatus of claim 46 wherein the physical layer packet further comprises a second block of one or more MAC packets for transmission to a second node, the physical layer packet further comprising a channel designation for the second node to send an acknowledgement of the second block to the apparatus.

50. The apparatus of claim 49 wherein the channel designations are blocked together, the physical layer packet further comprising a header for the block of channel designations, wherein the header comprises a designation indicating a data rate for transmission of the block of channel designations.

51. The apparatus of claim 50 wherein the physical layer packet further comprises a header for the block of one or more MAC packets and a header for the second block of one or more MAC packets, each of the headers comprising a data rate for transmission of its corresponding block.

* * * * *